United States Patent [19]

Stäbler

[11] Patent Number: 4,799,424
[45] Date of Patent: Jan. 24, 1989

[54] FLUID SEAL FOR MOVING BELTS

[75] Inventor: Gerhard Stäbler, Murr, Fed. Rep. of Germany

[73] Assignee: Santrade Ltd., Luzern, Switzerland

[21] Appl. No.: 102,530

[22] Filed: Sep. 29, 1987

[30] Foreign Application Priority Data

Oct. 8, 1986 [DE] Fed. Rep. of Germany ....... 3634274

[51] Int. Cl.⁴ .................. F16J 15/16; B30B 5/06; B65G 15/60; B08B 15/02
[52] U.S. Cl. .............................. 100/154; 100/93 RP; 156/555; 156/583.5; 277/DIG. 7; 198/837; 425/371
[58] Field of Search .................. 100/93 RP, 151, 153, 100/154; 156/555, 583.5; 425/371; 277/DIG. 7, 157, 12; 198/836, 837, 840, 841

[56] References Cited

U.S. PATENT DOCUMENTS 4,365,548 12/1982 Pankoke ............................ 100/154
4,665,818 5/1987 Held ................................ 156/555 X
4,693,177 9/1987 Pankoke .................. 277/DIG. 7 X

FOREIGN PATENT DOCUMENTS 3310700 9/1984 Fed. Rep. of Germany .

Primary Examiner—David Werner
Attorney, Agent, or Firm—Burns, Doane, Swecker & Mathis

[57] ABSTRACT

A conveying apparatus comprises a conveyor belt and a housing disposed atop a conveying surface of the belt to form a chamber communicating with that surface. A fluid sealing assembly extends between the housing and the belt and comprises a profile cord engaging the belt surface. The profile cord is free to change its shape to conform to the belt configuration. The profile cord is mounted at the free ends of spring fingers which are anchored to the housing. The regions between adjacent fingers are sealed by a sealing strip which engages the fingers. The spring fingers are formed by providing parallel slits in a spring steel plate.

21 Claims, 11 Drawing Sheets

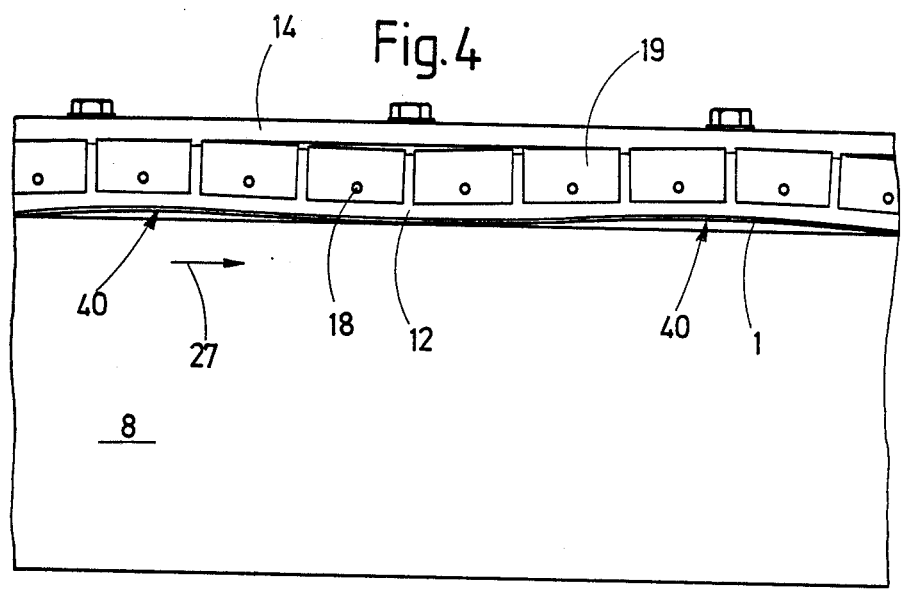
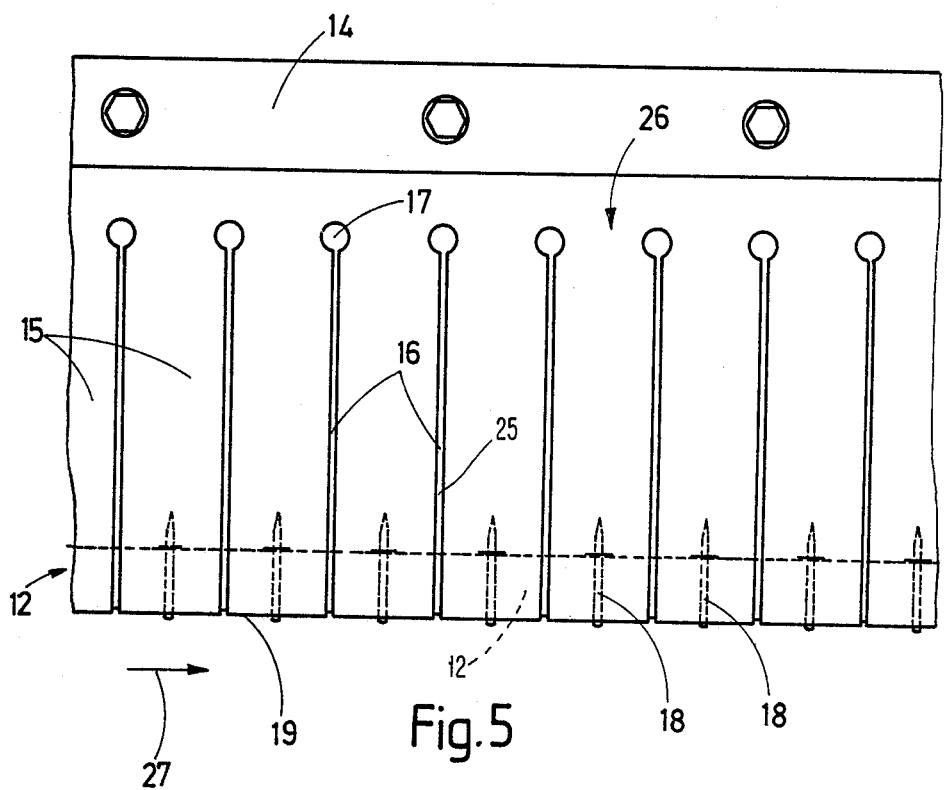

4,799,424

FLUID SEAL FOR MOVING BELTS

BACKGROUND OF THE INVENTION

The invention concerns a sealing assembly for use in forming a fluid-tight chamber against a moving belt, such as a dual belt press.

There are numerous processing installation, in which conveyor belts, in particular steel belts, are used to carry goods wherein the goods are exposed to the effects of a gas or wherein the ooods release toxic gases that must be exhausted, without affecting the environment. Thus, for example, in a cooling belt installation for the solidification of liquid tar, a layer of tar flows over a weir and is deposited at a temperature of approximately 300° C. in a relatively low viscosity state, onto a traveling belt. The tar is cooled on the belt by spraying the underside of the steel belt with water or the like, until the tar solidifies. The tar solidified in this manner may be processed into granules.

The hot tar emits vapors harmful to the environment, so the vapors are exhausted by means of exhaust hoods above the cooling belt and purified in an air cleaning installation. In known installations of this type it is a disadvantage that the exhaust hoods covering the belt are insufficiently sealed relative to the belt, so that in addition to the exhaust gases, surrounding air is also sucked in. This occurrence does not adversely affect the suctioning step itself, but it adversely increases the expense of the subsequent purification process due to the increased volume of gas to be cleaned. Thus, the inflow of uncontaminated air leads to an undesirable complication of the purification of exhaust gases.

If products are to be cooled or heated on a moving belt under the effect of a certain gas, such as an inert gas (e.g., in order to prevent the occurrence of certain chemical processes during the cooling or heating), the sealing problem becomes even more important, as the escape of the treating gas from the treatment chamber must be prevented.

Known arrangements exhibit only inadequate sealing means or none at all. This is mainly due to the fact that the materials usually employed for sealing, such as rubber or the like, cannot withstand the aforementioned high temperatures, e.g., approximately 300° C. in some cases without being damaged. For this reason, sealing has been effected only by metal strips or the like, which however, cannot attain an optimum sealing action, as the moving surface of the belt is not straight. It has been discovered that steel belts deform under the effect of the high temperatures prevailing, for example, during the deposition of liquid tar, and in particular become wavy at the edges not covered by the tar, so that it is not possible in these locations to use stiff sealing strips.

In known dual belt presses, involving the creation of pressure chambers adjacent to the steel belts, similar problems arise. The membrane seals proposed for such installations (e.g., see German DE No. 33 10 700 A1) cannot provide a solution of the problem, as the sealing profiles are seated in stationary guide ledges.

It is an object of the invention to provide a sealing layout of the above-mentioned type so that even at very high temperatures the sealing of wavy or deformed belts becomes possible.

SUMMARY OF THE INVENTION

This object is attained by the present invention which relates to a sealing assembly for use in forming a fluid-tight chamber against a moving belt. The sealing assembly comprises a plurality of spring plates disposed in side-by-side relationship to form a row. Each spring plate is anchored at one end and is freely elastically movable at an opposite free end thereof. The free ends are movable relative to one another. An elongate flexible profile element extends generally parallel to the row of spring plates and is mounted on the free ends of the plates such that the free end of each spring plate is mounted to a portion of the profile element. The profile element is adapted to bear against a surface of a belt and flex to conform to the configuration of that surface while maintaining a seal therewith. An elongate strip extends generally parallel to the row and is carried by the plurality of spring plates at a location intermediate the profile element and the anchored ends in order to seal regions between adjacent ones of the strip plates.

This configuration ensures that the profile element is able to conform to the shape of the belt surface since the spring plates can move relative to one another. Therefore, even corrugated belts or the like may be properly sealed. The novel sealing arrangement is suitable:

(a) for the sealing of pressure chambers in dual belt presses, wherein the seal is arranged around the entire pressure chamber and the chamber is endlessly bordered by the seal;

(b) for the sealing of moving steel belts of any type against suction spaces, pressure chambers and the like, involving different media, such as gas, water, oil, air; with steel belt dryers, coolers, suction belts, or the like;

(c) for the sealing of large rotating drums against large stationary flanges of a pipe line, whereby a relatively high volume flow, for example, smoke gas or process gas is conducted through the rotating drum; and (d) as a sealing for hot liquid products deposited onto a revolving steel belt, the vapors of which are to be suctioned off.

The profile element is preferably in the form of a packing cord which may have an adequately stable or self-supporting configuration. The cord is placed in a somewhat articulated manner on the free ends of the spring plates which are arranged adjacent to each other in a comb-like fashion. The packing cord is thereby rendered capable of adapting its position to the surface to be sealed, independently of the plate springs. By means of the plurality of the spring plates, the cord is pressured in all locations with an appropriate contact pressure against the belt surface.

The spring plates may be produced in a very simple manner from a strip of spring steel by forming parallel slots in one edge thereof. To prevent the escape of air through the slots between the plate springs, two rows of spring plates may be placed over each other to sandwich the strip therebetween. The strip may comprise thermally resistant and/or dynamically resistant cloth or metal foil or glass fiber reinforced Teflon, which is sufficiently resilient to preserve the individual freedom of movement of the spring plates but dense enough to prevent the flow of gas. The spring plates may have bent lips at their free ends between which the packing cord is articulately held by a pin passing transversely through it. Advantageously, the strip may have an edge disposed between the packing cord and one of the lips so that the spring plates press the packing cord against both the strip and the moving belt surface. Good sealing is obtained in this manner without additional sealing measures. The frictional forces between the packing cord and the surface of the belt are absorbed by the spring plates and conducted to the press frame.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIG. 4 is a view of the sealing arrangement as viewed in the direction of the arrow IV in FIG. 3;

FIG. 5 is a top plan view of the sealing arrangement s viewed in the direction of the arrow V in FIG. 3;

DETAILED DESCRIPTION OF PREFERRED EMBODIMENTS OF THE INVENTION

Figure 1:
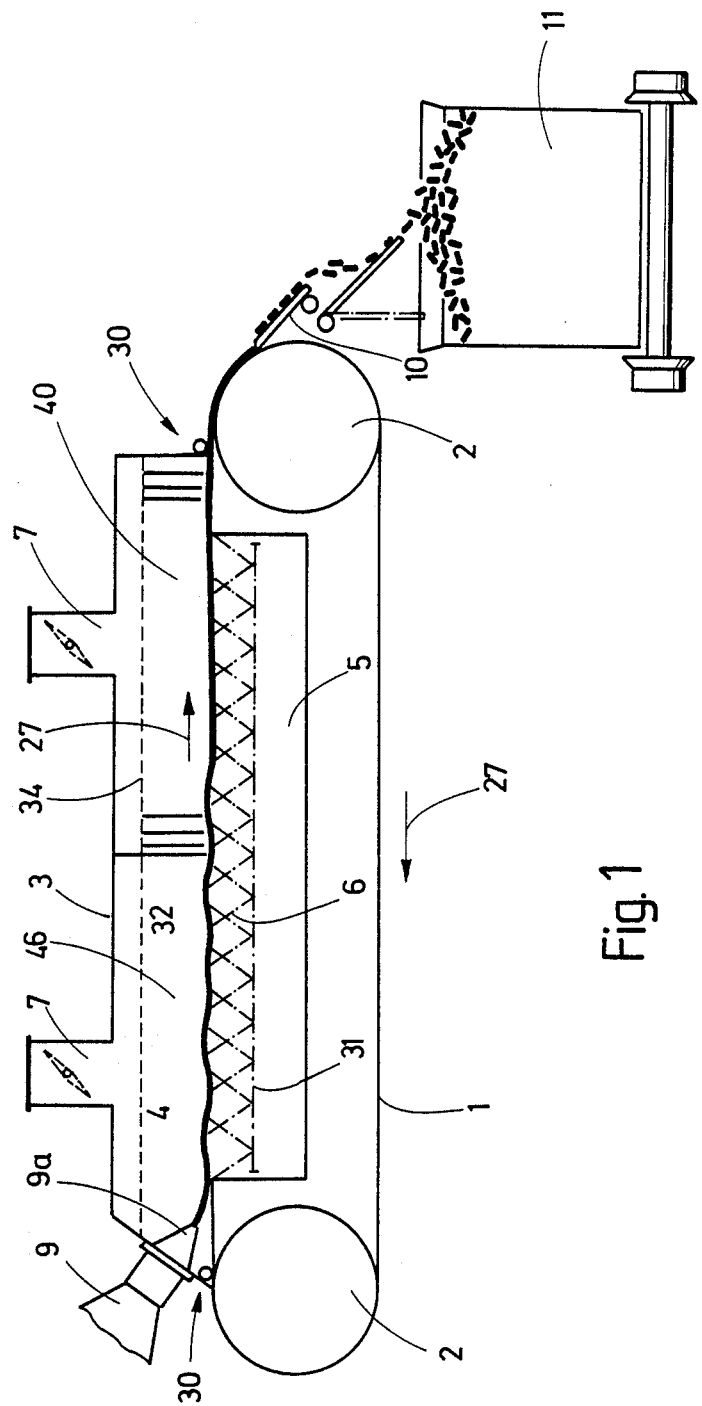
FIG. 1 is a schematic longitudinal sectional view of a belt cooler with an exhaust device placed upon it.

FIGS. 1 to 5 depict a belt cooler comprising a revolving steel belt 1 guided around two reversing rolls 2 and moved by means of a drive (not shown) in the direction of the arrow 27. A hood-like cover 3 is disposed over the upper flight 1a of the steel belt 1 which cover is equipped with seals against the steel belt 1, both in the longitudinal traveling direction 27 and in the transverse direction 30, in order to prevent any contact of the material 4 conveyed in the area under the covering hood 3 with the environment outside the hood 3. In the example shown, the hood 3 is in the form of an exhaust hood comprising two exhaust ducts 7 whereby the vapors rising from the product 4 may be exhausted by the application of suction pressure within the cavity 46. The product 4 may comprise hot tar or other substance which is deposited as a viscous paste or a near liquid onto the upper flight of the steel belt 1 through an outlet slot 9a of a feeder device 9.

A cooling tank 5 is provided under the upper flight of the steel belt 1, wherein several pipes 31 are located. A cooling liquid, for example water, is introduced through the pipes and directed against the underside of the upper flight of the steel belt 1 in the form of spray jets, thereby contributing to the cooling of the product 4. The cover hood 3 is divided by a partition 32 into two compartments, in which different conditions may be established above the product passing therebeneath.

Figure 2:
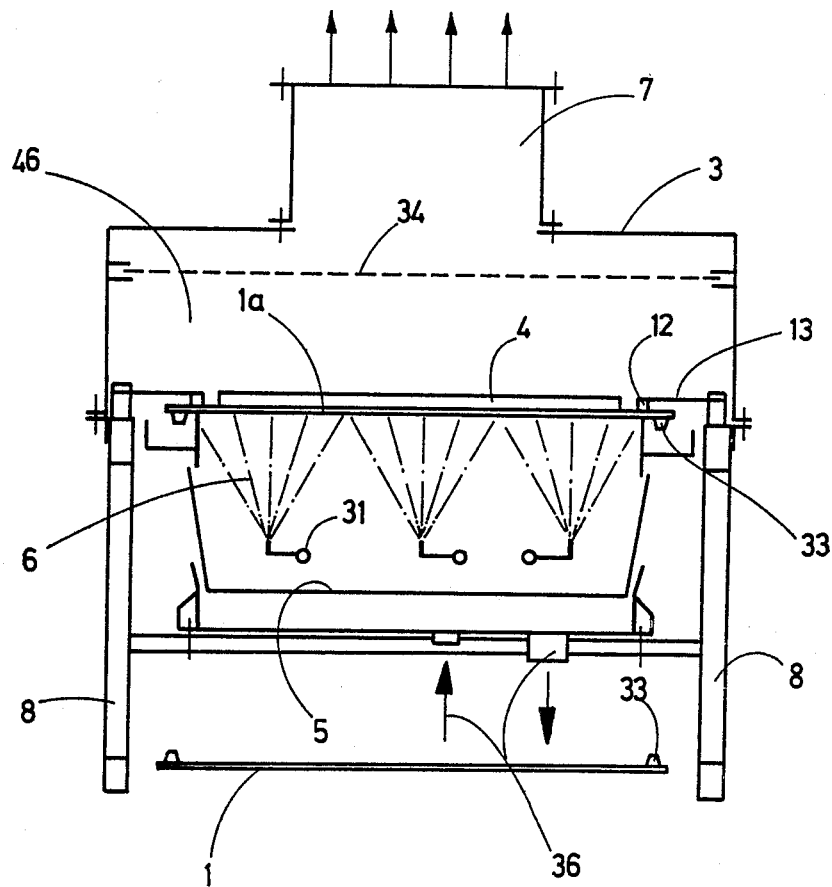
FIG. 2 is an enlarged schematic cross-section through the belt cooler of FIG. 1.

As seen in FIG. 2, the steel belt 1, equipped at its edges with inwardly directed drip ledges 33, is sealed along the top side of the upper flight 1a by means of lateral seals 12, 13 extending in the traveling direction of the belt. The seals are fastened stationarily to the support frame 8 of the belt cooler and, as will be explained below, are pressed elastically from above onto the upper flight 1a of the belt 1. Within the cover hood 3 a perforated sheet of metal 34 is mounted as a suction bottom for the uniform distribution of the exhaust air.

Figure 3:
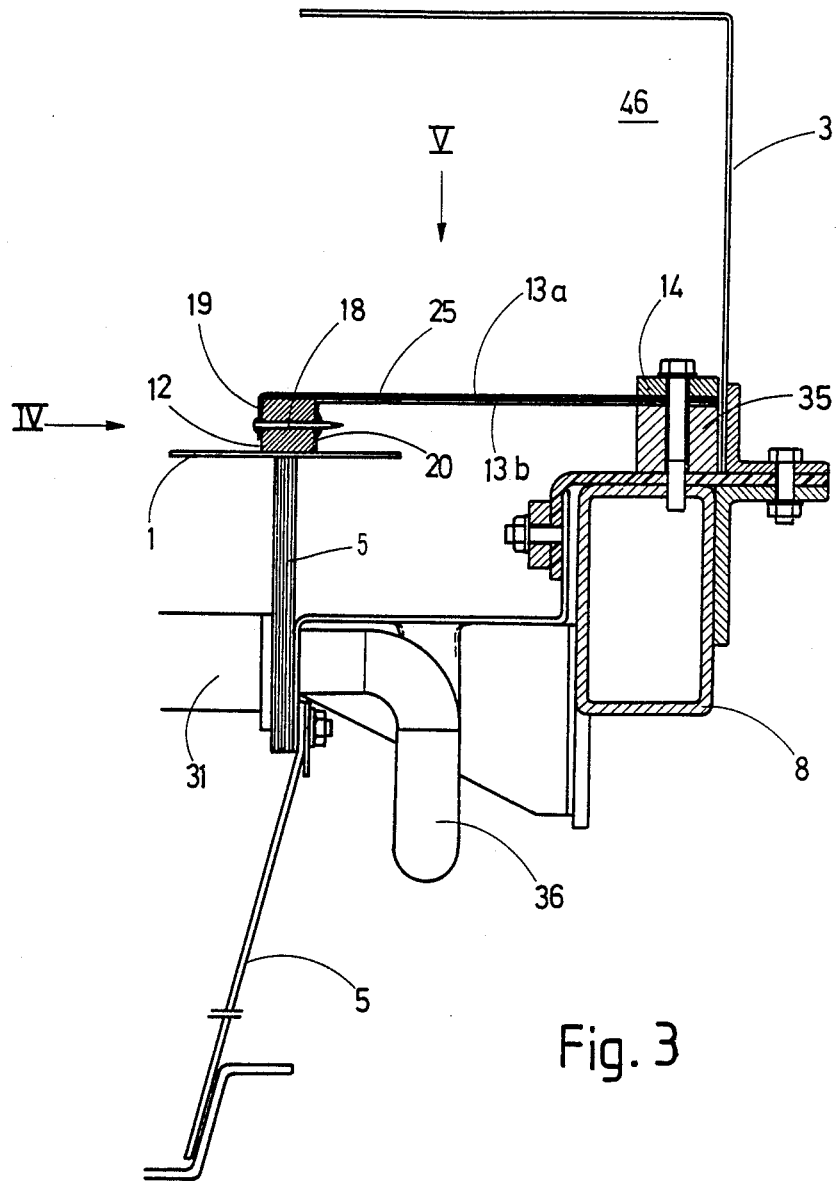
FIG. 3 is an enlarged fragmentary cross-sectional view of the sealing arrangement for the belt cooler of FIG. 1.

As seen in FIGS. 3 to 5, the lateral seal includes a flexible profile element in the form of a packing cord 12 extending parallel to the outer edges of the belt, which element for example may comprise one of a number of commercially available packing cords. For example, the packing cord may be made of aramide fibers or materials known under the tradenames Arolan and Thermaflex. Such material is heat resistant in contrast to the usual sealing materials, such as rubber, but is not elastic in itself. When in the form of a packing cord 12, however, the element is capable of also yielding transversely to the longitudinal direction.

The packing cord 12 is fastened by means of longitudinally-spaced pins 18 extending transversely to its longitudinal direction of the elements. Preferably, the pins 18 are spaced apart uniformly and pass through vertical bent edges 19 and 20 of plate spring lamella 13a and 13b. The bent edges comprise free ends of the lamella the opposite ends of which are horizontal. The horizontal ends are clamped stationarily in a clamping device 14, 35 screwed fixedly to the support frame 8. Each of the plate spring lamella 13a, 13b comprises (as seen in FIG. 5), a steel strip 26 held stationarily by the clamp 14, 35. The strip 26 is provided with parallel slots 16 extending from the free edge of the strip to form a plurality of side-by-side spring plates or fingers 15. The closed end of the slots 16 terminates in bores 17 which facilitate the production of the steel strip 26 in the lamella form. The fingers of each strip have their horizontal portions disposed in parallel superimposed relationship to the horizontal portions of respective fingers of the other strip. Sandwiched between the horizontal portions of each pair of strips 26 is a collar or sealing strip 25. The sealing strip preferably comprises a cloth impermeable to air and is held, together with the two steel strips 26, tightly by the clamp 14, 35. The sealing strips 25 therefore seal along the slots 16 to isolate the region above the upper flight 1a from the region therebelow. The end of the sealing strip may be wrapped around a part of the packing cord 12 engaged by the lip 19 in order to maximize the sealing action.

Also visible in FIG. 3 are the spray pipes 31 which are disposed inside the tank 5 and connected to inlet and outlet lines 36.

Due to the comb-like configuration of the plate spring lamella 26, the lamella comprises relatively movable fingers 15 which enable the packing cord 12 to adapt itself freely to the undulations 40 of the steel belt 1. For this purpose, the packing cord 12 is being held freely (i.e., unclamped between the two bevels 19, 20) and is supported in an articulated manner by the pins 18. Thus, the packing cord 12 is able to adapt itself over its entire length to the belt 1 to be sealed, even if the latter should contain undulations.

In the afore-described embodiment, the cover hood performs as an exhaust hood. It is also possible to utilize the cover hood 3 as a ventilating hood by introducing gas through the ducts 7, so that a certain overpressure prevails within the cover hood. With such a ventilating hood, it is possible to expose the product 4 along a portion or all of the conveying path to an inert gas or another gas atmosphere, should this be required. In that case, the seals shown in FIGS. 3 to 5 would perform the sealing function.

All of the embodiments shown have the advantage that the sealing material may be selected in accordance with the process temperature and other process parameters independently of pressuring devices. Reliable sealing may therefore be obtained even at very high temperatures.

In FIGS. 6 to 13, it is depicted how a sealing arrangement according to the present invention can be employed to seal the pressure or lubricating chambers of a dual belt press. It can be seen in FIG. 6 that the plate spring lamella 113a, 113b which may have the same configuration as in the afore-described embodiment, are fastened stationarily to the edges of the walls 150, 150' defining the pressure chambers 146, 146' of a dual press, the remainder of which press is not shown in detail. The two belt flights 100, 100' facing each other are spaced apart at their edges by spacer strips 154 located between them. The belts encompass in a known manner the conveyed material to be treated. The pressure chambers 146, 146' may be exposed to a predetermined pressure via openings 160, 160'. This pressure acts, on the one hand, against one of the two belt flights 100, 100' and, on the other hand, against the sealing arrangement, which by the provision of the sealing strip 25, prevents escape of pressure. The packing cord 112, which is fastened by means of a pin 118 to the plate spring lamella 113a, 113b is pressured against its belt flight by the pressure prevailing in the respective chamber 146 and 146'. The spring pressure inherent in the plate spring lamella 113a, 113b will reinforce the contact pressure effect. The spacer strips 154 are disposed in the area between the cords 112 to act as pressure backing members.

To restrict the bending of the lamella 113a, 113b to a certain maximum amount, a clamping strip 151 is provided, which projects inwardly past the clamping area, while forming an angle with the horizontal portions of the lamella. This clamping strip 151 is drawn tightly against the outer edge of the pressure chamber wall 150 by means of screws 152, while a flat gasket 153 is inserted therebetween to provide a seal.

Figure 6:
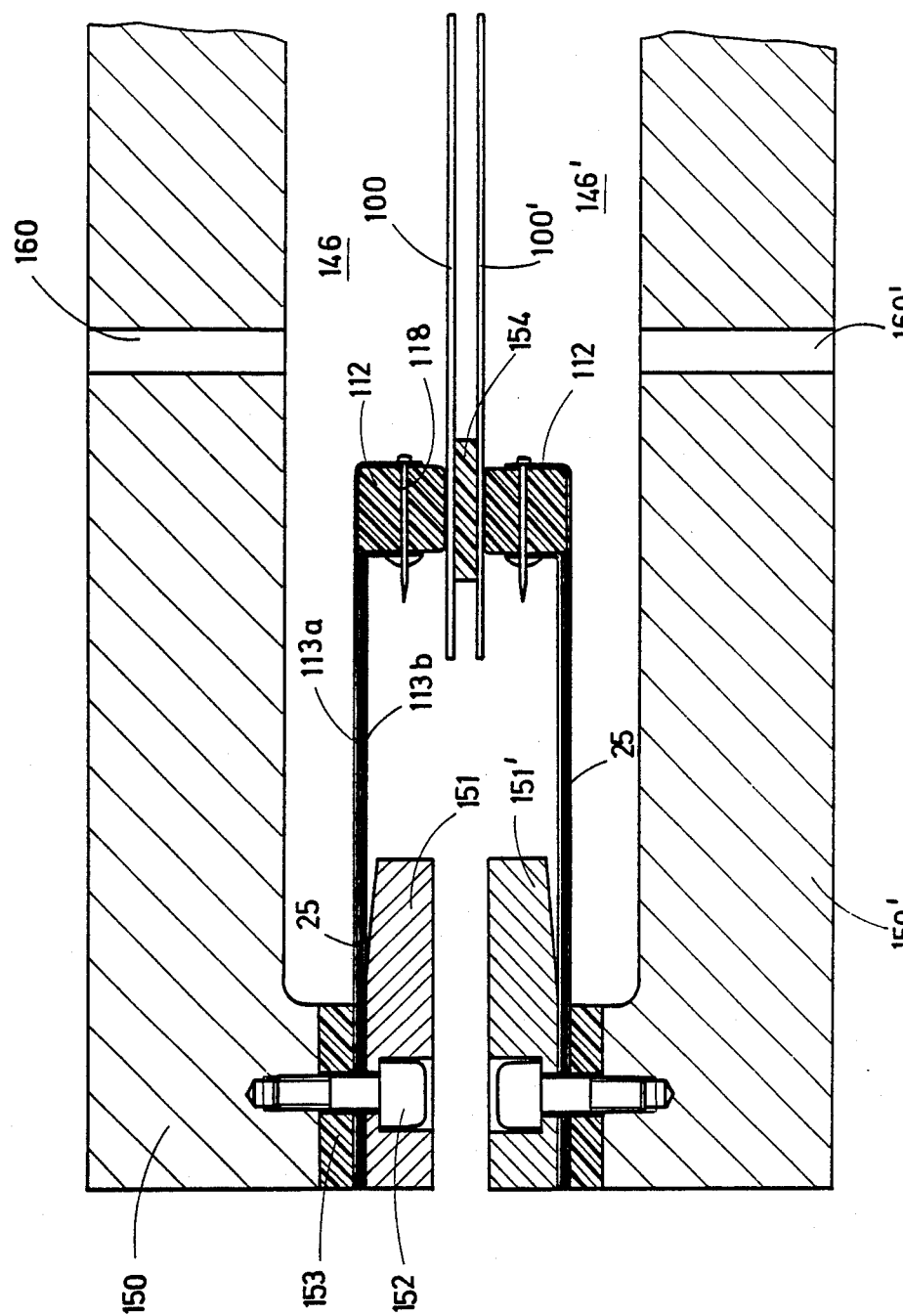
FIG. 6 is a fragmentary cross-sectional view through a modified form of the sealing arrangement according to the invention for use in a pressure or lubricating chamber of a dual belt press.
Figure 7:
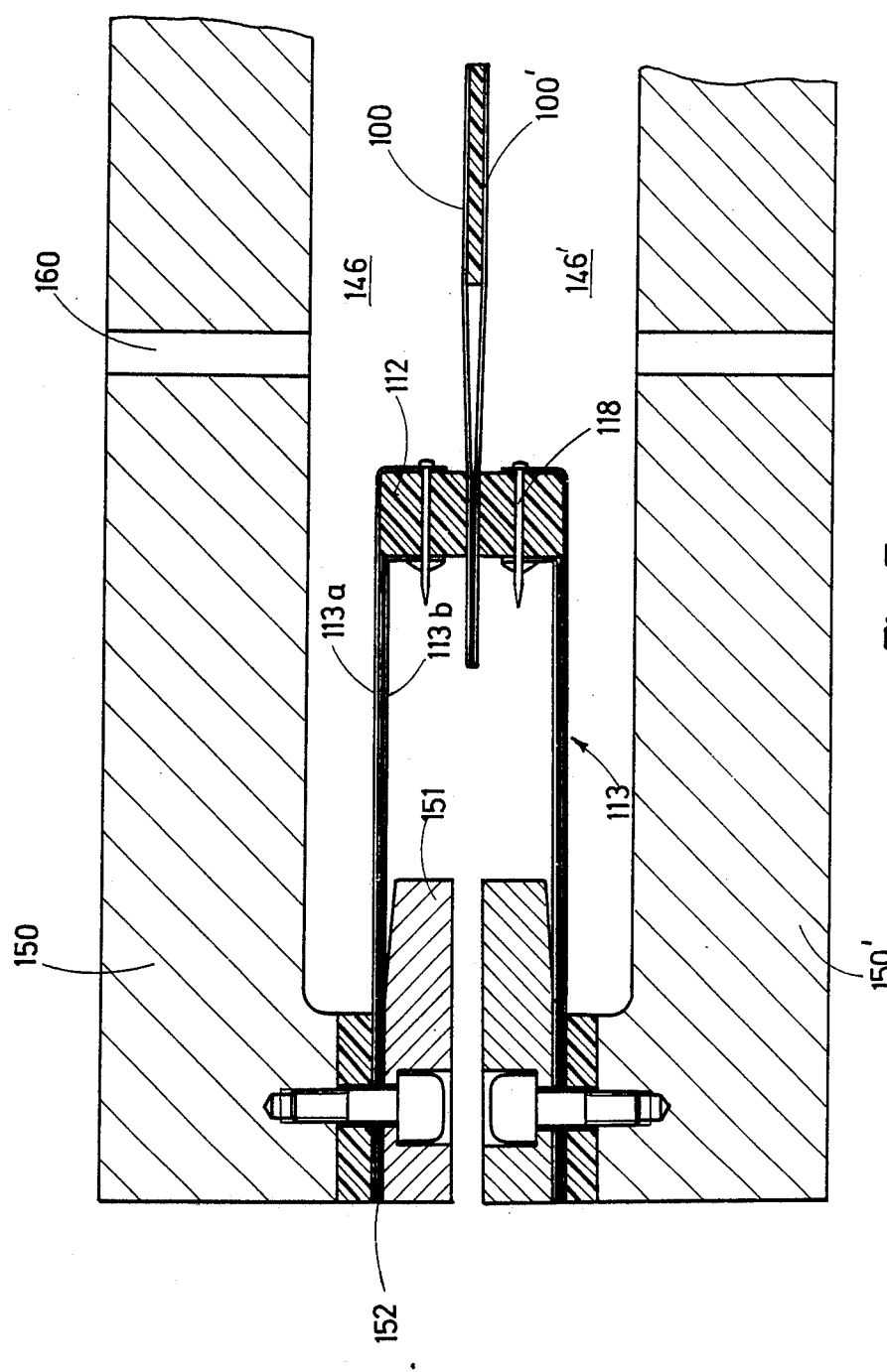
FIG. 7 is a view similar to FIG. 6 wherein the sealing arrangement presses together the outer edges of the steel belts.

FIG. 7, which shows an embodiment particularly useful in the production of thin laminates, is very similar to that of FIG. 6, so identical parts are designated by identical reference symbols. The difference involves the belt flights 100, 100' being deformed in the edge zone, wherein the two steel belts 100, 100' have no spacer strip between them but rather are compressed directly against each other by the sealing arrangement. The pressure in the cavities 146, 146' essentially effects the compression of the packing cord 112.

Figures 8, 9:
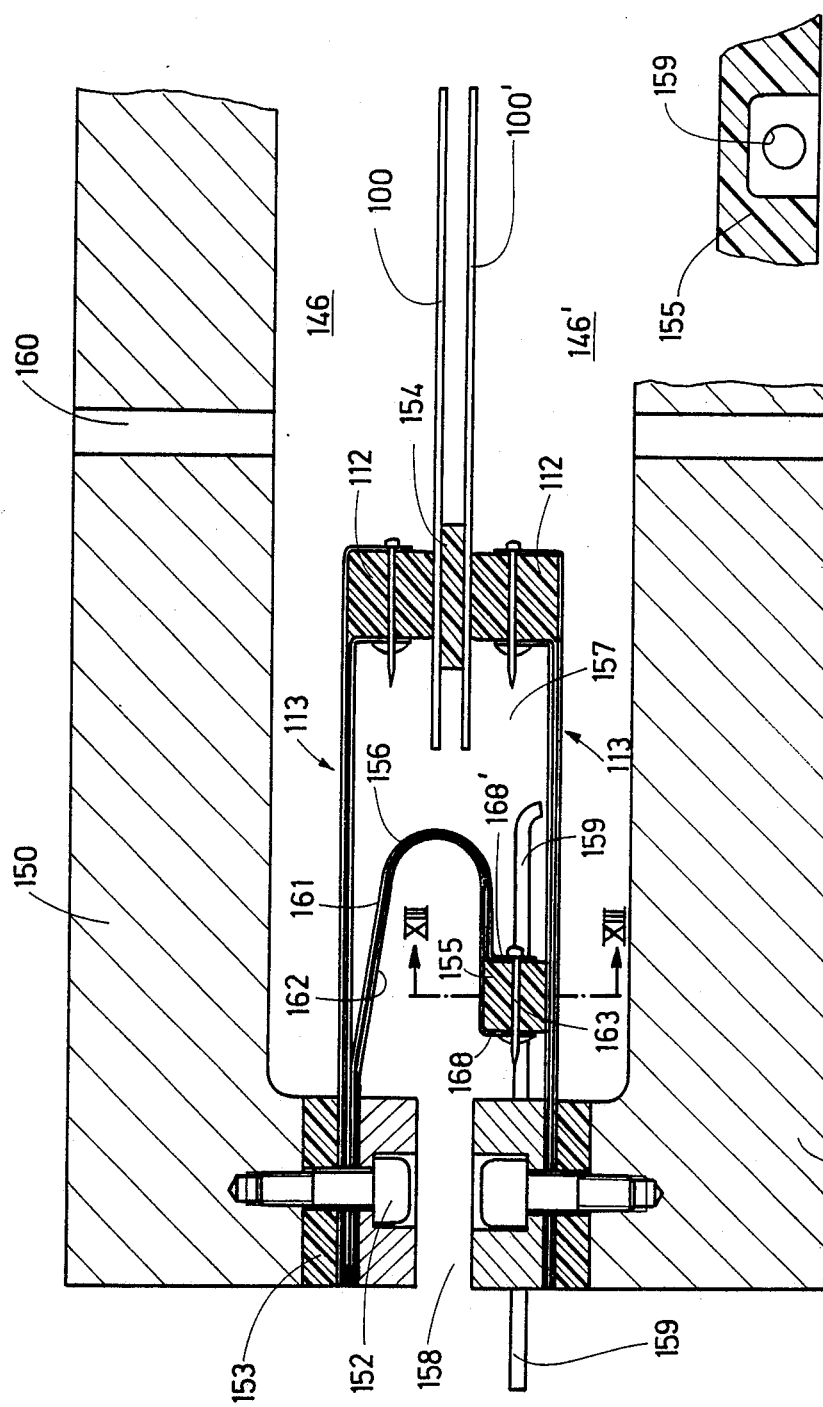
FIG. 8 is a view similar to FIG. 6 of a modified sealing arrangement.
FIG. 9 is a sectional view taken through FIG. 8 along the line XIII—XIII.

FIG. 8 also shows a sealing arrangement similar to that of FIG. 6. Here, however, an additional seal 156 is provided to seal-off a prechamber 157 against both the pressure chambers 146, 146' and the environment 158. A suction pipe 159, which communicates with the prechamber 157, extends through an auxiliary seal having a packing cord 155 as shown in FIG. 9. The sealing cord 155 is held between the lips 168 and 168' of bent plate spring lamella 162 and 161. A seal strip 156, comprising a cloth-like material, is clamped between reversely curved portions of the lamella 162, 161. The packing cord 155 is held by pins 163 which extend between the lips 168, 168' similar to the afore-described packing cord 157. By suctioning-off medium from the prechamber 157, the pressure in prechamber 157 may be reduced so that the contact pressure on the plate spring lamella 113 and their packing cords 112 is increased. If, however, a medium is introduced into the chamber 157, a counter pressure is generated in the prechamber that may be used to regulate the contact pressure on the packing cords 112 during the operation of the press in a simple manner and to adjust it to an optimal value. It is obviously also possible to suction-off by means of the suction pipe 159 the leakage which may pass through the packing cords 112.

Figure 10:
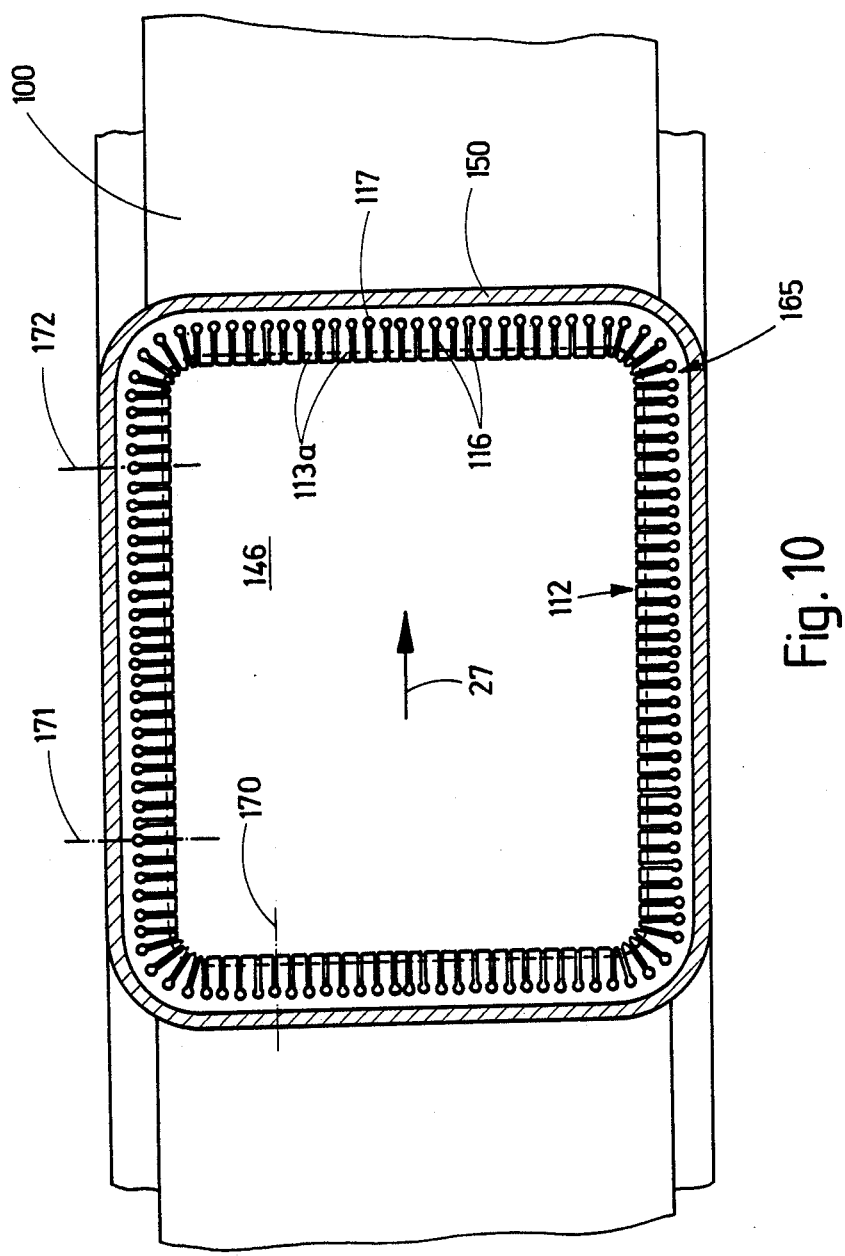
FIG. 10 is a horizontal sectional view of a sealing arrangement for the complete sealing of a pressure or lubricating chamber against the upper belt of a dual belt press.

FIG. 10 shows, at reduced scale, a sectional view through one of the pressure chambers 146 located above a belt flight 100 which travels in direction 27. The flight is sealed against the pressure chamber 146 by means of a circumferential frame 165, comprising the plate spring lamella 113a fastened to the circumferential clamping edges 150 of the pressure chamber. The frame is shown in section in FIG. 6. Also shown are the slots 116 with the bores 117 at their ends, which separate the individual plate spring lamella 113a from each other.

In this frame-type sealing arrangement, and also in other sealing arrangements such as that according to FIGS. 1 to 5, the spring steel strips constituting the plate spring lamella 113a may be formed by separate pieces placed adjacent to each other. One such piece may extend from line 170 to line 171, and another piece may extend from line 171 to line 172. At the joints defined by the lines 170, 171 and 172, the joints may be overlapped by the seal 25 placed between the plate spring lamella 113a, 113b. The packing cord 112 may abut in these locations by right-angle corners, or the edges may be beveled in a known manner.

The plate spring lamella 113a and the membranelike sealing strip 25, are attached by screws at their outer edges to the pressure chamber wall 150 with flat seals or O-ring seals disposed around the screws, and are freely flexibly movable at their other end. The packing cord is secured in the manner shown in FIG. 6 and other figures. The slots 116 between the individual plate spring lamella 113a also serve as thermal expansion gaps, so that the surrounding spring steel strip will not warp during thermal expansions.

Figure 11:
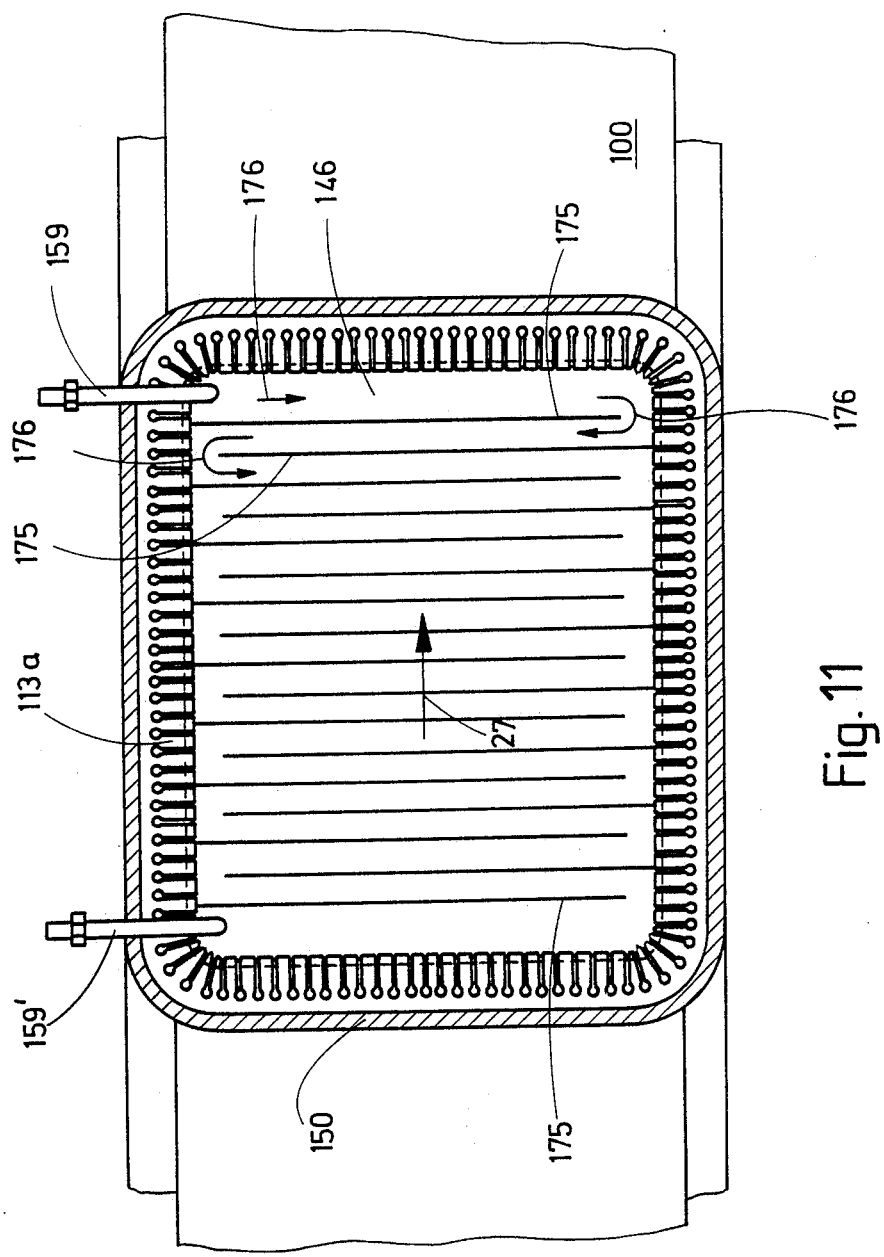
FIG. 11 is a view similar to FIG. 10 of a modified sealing arrangement in which the sealed medium is circulating.

FIG. 11 shows a horizontal section similar to FIG. 10. Here, however, the medium from the pressure chamber 146, which may comprise oil, water, a lubricant or a cleaning substance, for example, is circulated. Conventional stripping ledges 175 usually provided in the pressure chamber 146 are in this case provided in the form of guide rails for the medium introduced or removed by the exhaust or feeder pipes 159, 159'. The ledges comprise baffles arranged in such manner that the medium introduced and passing through in the direction of the arrows 176 must necessarily contact all locations of the pressure chamber. In this case, it is not necessary to maintain an especially high pressure in the cavity 146. However, high pressure may be entirely appropriate, for example, for the passage of lubricants, or the like.

Figure 12:
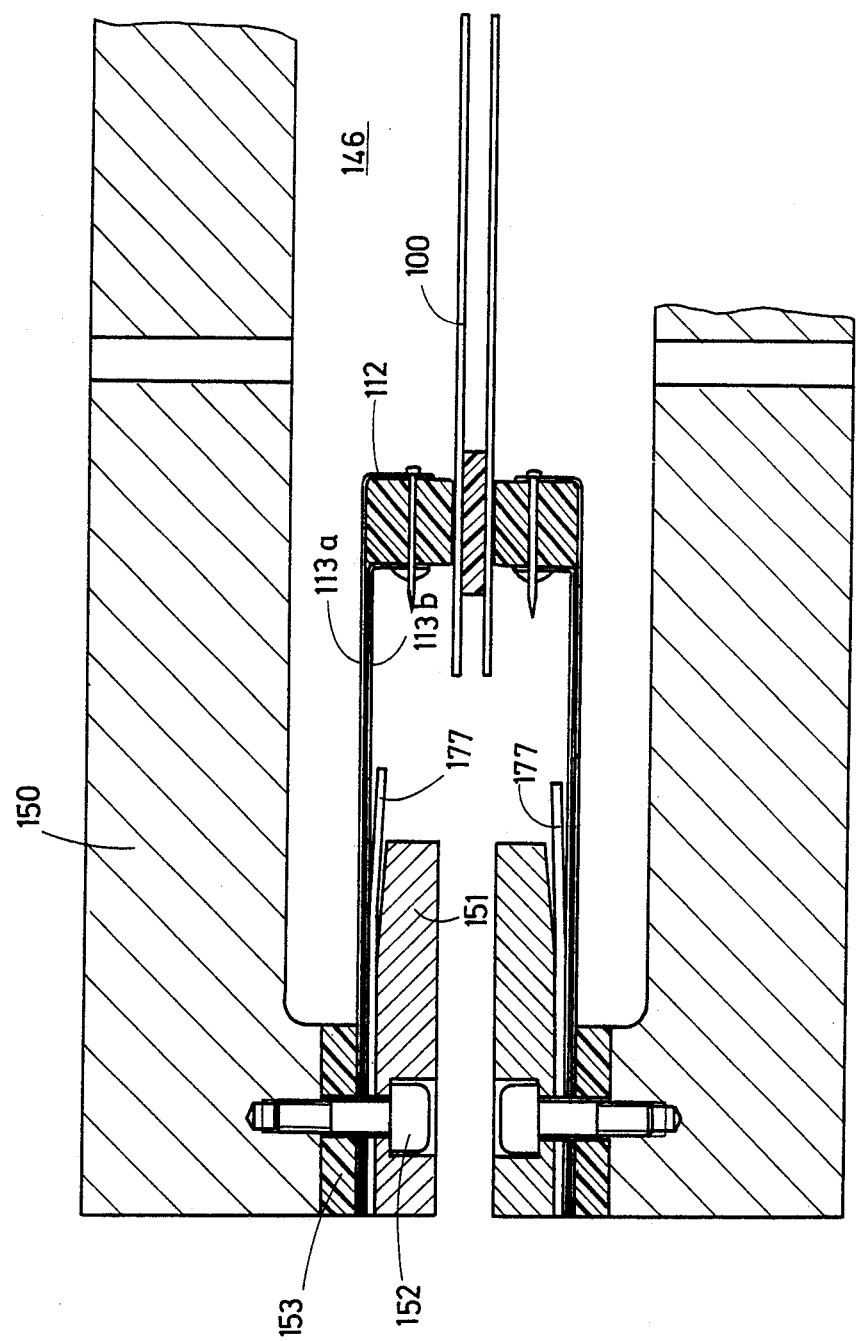
FIG. 12 is a view similar to FIG. 6 of another modified sealing arrangement.

FIG. 12 shows an arrangement similar to that of FIG. 6, except that a further row of plate spring lamella 177 is provided between the clamping strips 151 and the spring steel strip lamella 113a, 113b, in order to prevent unacceptable bending of the prestressed spring steel lamella 113a, 113b in the case of high pressures in the cavity 146. In the absence of this expedient, the contact pressure on the packing cord 112 could become excessively high.

Figure 13:
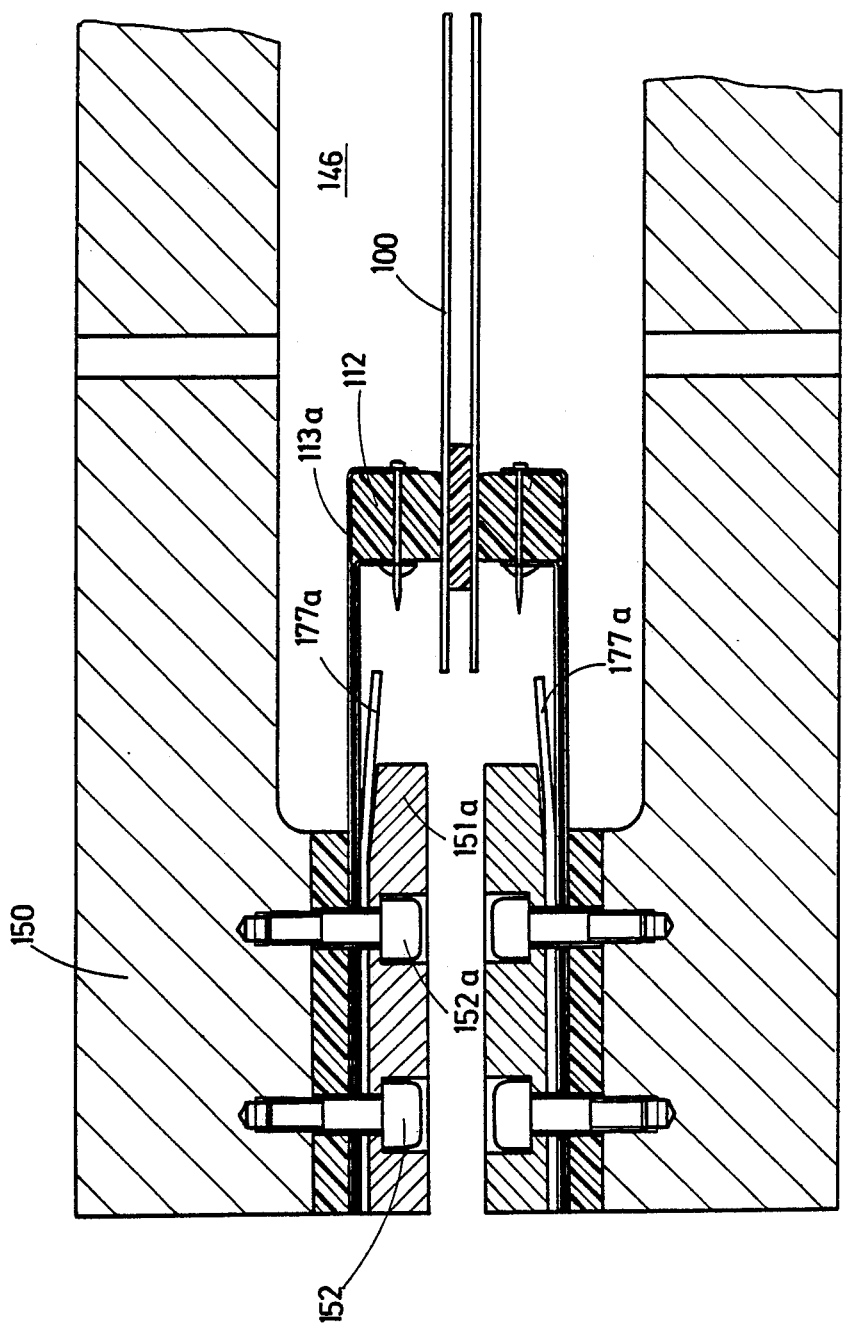
FIG. 13 is a view similar to FIG. 12 of a further modified clamping means for the spring plates.

FIG. 13 shows an embodiment similar to FIG. 12, except that the additional plate spring lamella 177a are drawn even further toward the packing cord 112, and that the clamping strip 151a is also drawn further into the sealing zone. For this purpose, the clamping strips 151a and the additional plate string lamella 177a are fastened by two rows of threaded bolts 152, 152a to the associated pressure chamber 150.

Although the present invention has been described in connection with preferred embodiments of the invention, it will be appreciated by those skilled in the art that modifications, additions, deletions and substitutions not specifically described may be made without departing from the spirit or scope of the invention as defined in the appended claims.

What I claim is:

1. A sealing assembly for use in forming a fluid-tight seal against a moving belt, said sealing assembly comprising a plurality of spring plate means disposed in side-by-side relationship to form a row, each said spring plate means being anchored at one end and freely elastically movable at an opposite free end thereof, said free ends being movable relative to one another, an elongate flexible profile element extending generally parallel to said row and mounted on said free ends such that each said free end is mounted to a portion of said profile element, said profile element adapted to bear against a surface of a belt and flex as said free ends move relative to one another to conform to the configuration of that surface while maintaining a seal therewith, and an elongate strip extending generally parallel to said row and carried by said plurality of spring plate means at a location intermediate said profile element and said anchored ends in order to create a seal between adjacent ones of said spring plate means.

2. A sealing assembly according to claim 1, wherein each said spring plate means comprises a pair of spring plates disposed in superimposed relationship, each spring plate including a bent free end, said bent free ends being parallel, and said profile element mounted therebetween, said strip sandwiched between said spring plates.

3. A sealing assembly according to claim 2, wherein an edge of said strip disposed adjacent said free ends is sandwiched between said profile element and one of said bent ends.

4. A sealing assembly according to claim 2 including a pin extending between said bent ends of associated spring plate means and through said profile element.

5. A sealing assembly according to claim 2, wherein said profile element is flexible relative to said spring plate means in order to conform to the configuration of a belt.

6. A sealing assembly according to claim 1, wherein said strip is formed of temperature-resistant material.

7. A sealing assembly according to claim 6, wherein said strip comprises metal foil.

8. A sealing assembly according to claim 6, wherein said strip comprises glass fiber reinforced Teflon.

9. A sealing assembly according to claim 1, wherein said strip comprises a fabric.

10. A sealing assembly according to claim 1, wherein said row of spring plate means comprises a strip of spring steel having parallel slots therein forming said plurality of spring plate means, said slots being open at said free ends of said spring plate means.

11. A sealing assembly according to claim 10, wherein the ends of said slots opposite said free ends are closed and shaped as round bores.

12. A sealing assembly according to claim 1, wherein said profile element comprises a packing cord.

13. A sealing assembly according to claim 12, wherein said packing cord is formed of a heat-resistant material.

14. Conveying apparatus comprising a movable belt, means defining a sealed chamber along a portion of a surface of said belt, said chamber-defining means comprising wall means enclosing said chamber and sealing means sealing a region between said belt and an edge of said wall means, said sealing means comprising a plurality of spring plate means disposed in side-by-side relationship to form a row, each said spring plate means being anchored at one end to said wall means and freely elastically movable at an opposite free end thereof, said free ends being movable relative to one another, an elongate flexible profile element extending generally parallel to said row and mounted on said free ends such that each said free end is mounted to a portion of said profile element, said profile element bearing against said belt surface and flexing as said free ends move relative to one another to conform to the configuration of said surface while maintaining a seal therewith, and an elongate strip extending generally parallel to said row and carried by said plurality of spring plate means at a location intermediate said profile element and said anchored ends in order to create a seal between adjacent ones of said spring plate means.

15. Conveying apparatus according to claim 14, wherein said chamber comprises a pressurized chamber of a dual belt press.

16. Conveying apparatus according to claim 14 including a plurality of said sealing means disposed adjacent one another, said profile element of one said sealing means abutting said profile element of the adjacent sealing means, and said packing strip overlapping said abutting profile elements.

17. Conveying apparatus according to claim 14 including means generating a positive pressure in said chamber for biasing said free ends of said spring plate means toward said belt surface.

18. Conveying apparatus according to claim 14 including means for limiting the extent to which said spring plate means can be flexed toward said belt surface.

19. Conveying apparatus according to claim 14 including means forming, together with said sealing means, a second chamber outside of said first-named chamber, such that fluid leakage from said first-named chamber enters said second chamber, and means for drawing-off said leakage from said second chamber.

20. Conveying apparatus according to claim 14 including means forming, together with said sealing means, a second chamber outside of said first-named chamber, and means for controlling the pressure in said second chamber for regulating the force with which said profile element bears against said belt surface.

21. Conveying apparatus according to claim 14, wherein said edge of said wll means is endless and includes portions extending generally parallel to the direction of belt travel and portions extending transversely thereto, said strip extending endlessly completely around said chamber.

* * * * *